(12) United States Patent
Wiederin

(10) Patent No.: US 10,809,168 B2
(45) Date of Patent: Oct. 20, 2020

(54) SYSTEM AND METHOD FOR SAMPLING HALOSILANES

(71) Applicant: Elemental Scientific, Inc., Omaha, NE (US)

(72) Inventor: Daniel R. Wiederin, Omaha, NE (US)

(73) Assignee: ELEMENTAL SCIENTIFIC, INC., Omaha, NE (US)

( * ) Notice: Subject to any disclaimer, the term of this patent is extended or adjusted under 35 U.S.C. 154(b) by 119 days.

(21) Appl. No.: 15/547,669

(22) PCT Filed: Feb. 8, 2016

(86) PCT No.: PCT/US2016/017026
§ 371 (c)(1),
(2) Date: Jul. 31, 2017

(87) PCT Pub. No.: WO2016/127180
PCT Pub. Date: Aug. 11, 2016

(65) Prior Publication Data
US 2018/0017472 A1    Jan. 18, 2018

Related U.S. Application Data

(60) Provisional application No. 62/112,691, filed on Feb. 26, 2015.

(51) Int. Cl.
| | | |
|---|---|---|
| *G01N 1/38* | (2006.01) | |
| *B01J 10/00* | (2006.01) | |
| *G01N 1/40* | (2006.01) | |
| *G01N 1/22* | (2006.01) | |
| *B01J 20/281* | (2006.01) | |
| *B01J 19/18* | (2006.01) | |

(52) U.S. Cl.
CPC ............. *G01N 1/38* (2013.01); *B01J 10/00* (2013.01); *B01J 19/1806* (2013.01); *B01J 20/281* (2013.01); *G01N 1/22* (2013.01); *G01N 1/4044* (2013.01); *G01N 2001/386* (2013.01)

(58) Field of Classification Search
CPC .. G01N 1/38; G01N 1/4044; G01N 2001/386; B01J 19/28
See application file for complete search history.

(56) References Cited

U.S. PATENT DOCUMENTS

| | | |
|---|---|---|
| 7,273,588 B1 | 9/2007 | Cowles et al. |
| 2002/0198230 A1 | 12/2002 | Kingston |
| 2005/0288473 A1 | 12/2005 | Deforth et al. |
| 2006/0263251 A1 | 11/2006 | Watatsu et al. |
| 2010/0071346 A1 | 3/2010 | Klingberg |

FOREIGN PATENT DOCUMENTS

| | | | |
|---|---|---|---|
| CN | 201669104 U | 12/2010 | |
| CN | 102515454 A | 6/2012 | |
| JP | S53134175 A | 11/1978 | |
| JP | S543673 A | 1/1979 | |
| JP | S6042344 A | 3/1985 | |
| JP | H01302157 A | 12/1989 | |
| JP | 2006105718 A | 4/2006 | |
| JP | 2007252992 A | 10/2007 | |
| JP | 2009186197 A | 8/2009 | |
| JP | 2010066251 A | 3/2010 | |
| KR | 20100128834 A | 12/2010 | |
| WO | WO-0013761 A1 * | 3/2000 | ............... B01D 1/14 |

OTHER PUBLICATIONS

International Preliminary Report on Patentability dated Aug. 17, 2017 for PCT/US2016/017026.
International Search Report and Written Opinion dated Apr. 20, 2016 for PCT/US2016/017026.
Chinese Office Action for Application No. 201680009165.2, dated Aug. 9, 2019.
Office Action from Chinese Application No. 201680009165.2, dated Mar. 23, 2020.
Office Action from Japanese Application No. 2017-541274, dated Jan. 21, 2020.

* cited by examiner

*Primary Examiner* — Christopher Adam Hixson
(74) *Attorney, Agent, or Firm* — Kevin E. West; Advent, LLP

(57) ABSTRACT

This disclosure is directed to a system and method relevant to sampling halosilanes or other water-reactive samples. In embodiments, a system for hydrolyzing samples includes a container with a receiving liquid (e.g., an HF solution) contained therein and an actuator coupled with the container. The actuator can be configured to rotate the container, thereby inducing a vortex in the receiving liquid. The system further includes a sample tube configured to direct a halosilane sample into the vortexed receiving liquid. The sample tube can be oriented to release the sample in a flow direction of the vortexed receiving liquid.

13 Claims, 4 Drawing Sheets

SYSTEM AND METHOD FOR SAMPLING HALOSILANES

CROSS-REFERENCE TO RELATED APPLICATIONS

The present application claims priority under 35 U.S.C. § 119(e) to U.S. Provisional Application Ser. No. 62/112,691, filed Feb. 6, 2015 and titled "SYSTEM AND METHOD FOR SAMPLING HALOSILANES." U.S. Provisional Application Ser. No. 62/112,691 is incorporated herein by reference in its entirety.

BACKGROUND

Inductively coupled plasma (ICP) emission or graphite furnace atomic absorption (GFAA) spectroscopy techniques can be used to measure the presence of metal contaminants in liquid samples. Direct determination of low concentrations of metal contaminants in halosilanes using analytical instruments for ICPMS or GFAA is difficult due to the extreme reactivity of most halosilanes with water vapor in the air. Reactions between halosilanes and water vapor can result in formation of silicate precipitates and release of noxious acidic vapors, and can corrode the analytical instrument. Additionally, the presence of the halosilane can introduce matrix suppression and spectral interferences that can obscure accurate measurement of metal contaminants at low levels. It is therefore desirable to prepare halosilane samples for analysis by first hydrolyzing them in a hydrofluoric acid (HF) solution which can then be directly analyzed or further processed by evaporation or column pre-concentration.

SUMMARY

This disclosure is directed to a system and method relevant to sampling halosilanes or other water-reactive samples. In embodiments, a system for hydrolyzing samples includes a container with a receiving liquid (e.g., an HF solution) contained therein and an actuator coupled with the container. The actuator can be configured to rotate the container, thereby inducing a vortex in the receiving liquid. The system further includes a sample tube configured to direct a halosilane sample into the vortexed receiving liquid. The sample tube can be oriented to release the sample in a flow direction of the vortexed receiving liquid. It is noted that the system architecture and methodology described herein can be used to hydrolyze any reactive substance by introduction into a vortex induced in a receiving liquid, and is not limited to hydrolysis and/or sampling of halosilanes.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DRAWINGS

The Detailed Description is described with reference to the accompanying figures. The use of the same reference numbers in different instances in the description and the figures may indicate similar or identical items.

DETAILED DESCRIPTION

Overview

For applications such as, but not limited to, halosilane sampling with ICPMS or GFAA instruments, it is often desirable to prepare halosilane samples for analysis by first hydrolyzing them in an hydrofluoric acid (HF) solution that can then be directly analyzed or further processed by evaporation or column pre-concentration. Because of the reactivity of the halosilane with the receiving liquid (e.g., HF solution), a sample delivery line or tube can easily become clogged. This problem can be mitigated by introducing an inert shield gas using a concentric tube located around the sample delivery line, where the inert shield gas serves to prevent unwanted reaction of the halosilane inside the sample delivery line. However, this approach is challenging to implement because it requires concentric tubing and simultaneous streaming of the inert gas.

The present disclosure is directed to a system and method that facilitate halosilane hydrolysis without any need for concentric tubing or inert gas shielding. The system and method described herein rely on actuation (e.g., rotation) of a container having the receiving liquid contained therein, whereby the actuation induces a vortex in the receiving liquid. A halosilane sample (or any other water-reactive sample) can then be directed into the vortexed receiving liquid through an inert (chemically non-reactive) sample delivery tube. The halosilane sample is then directed into the vortexed receiving liquid. The rapid movement of the receiving liquid prevents a build-up of high silane concentrations at the point of entry, preventing polymerization reactions.

Example System Implementations

Figure 1A:
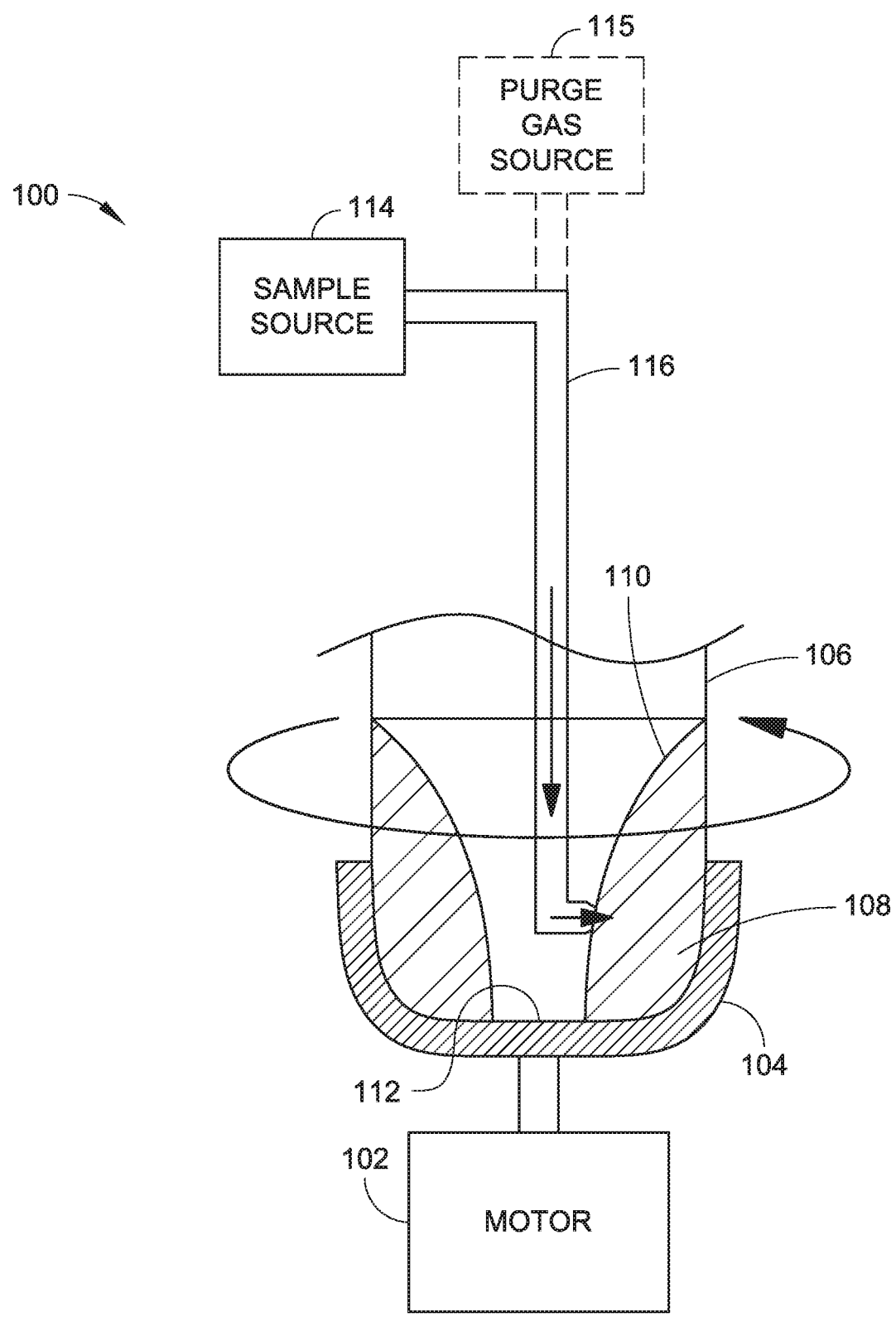
FIG. 1A is schematic diagram of a system for hydrolyzing samples, implemented in accordance with an embodiment of this disclosure.
Figure 1B:
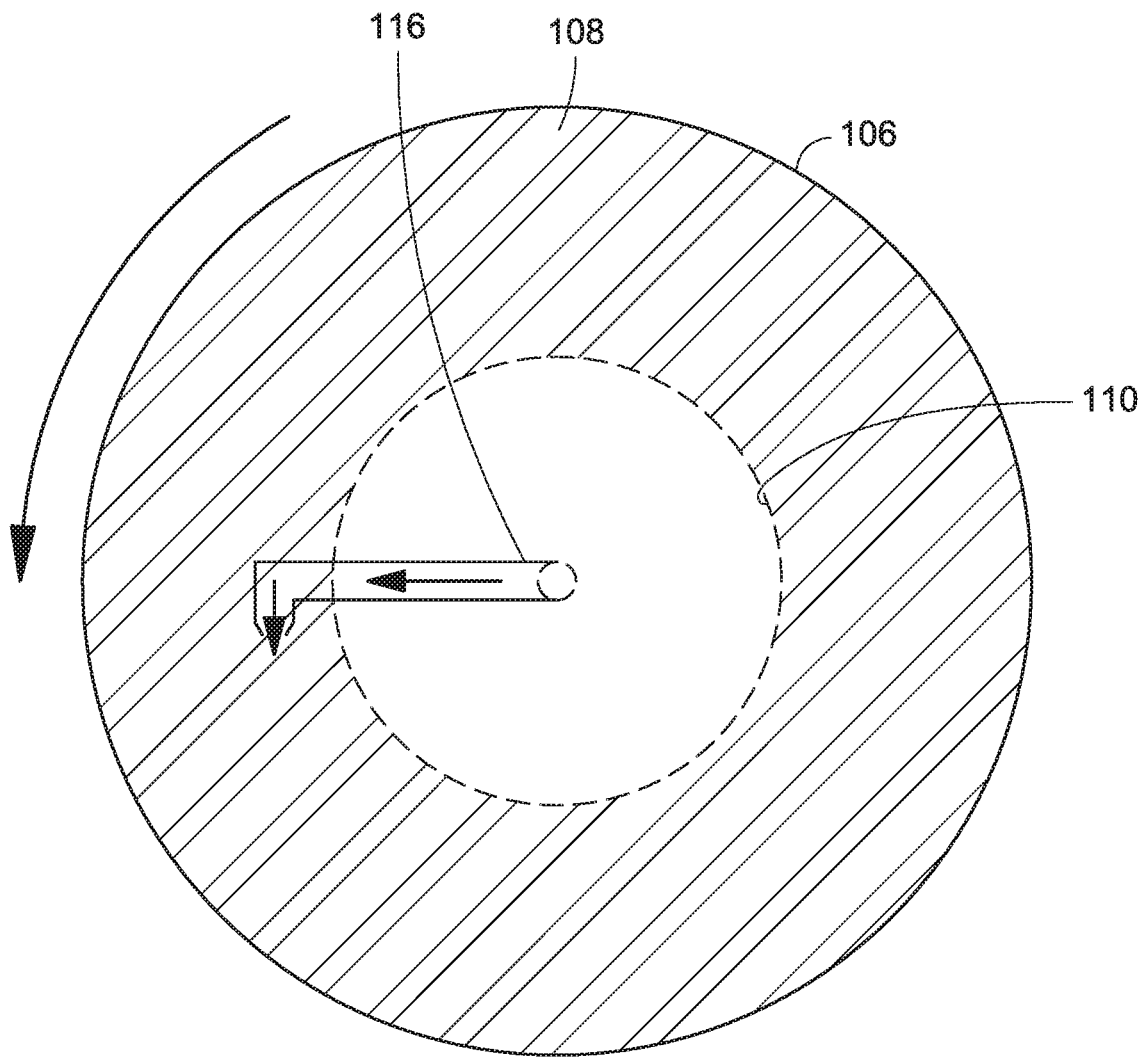
FIG. 1B is a top view of the system shown in FIG. 1A.
Figure 2:
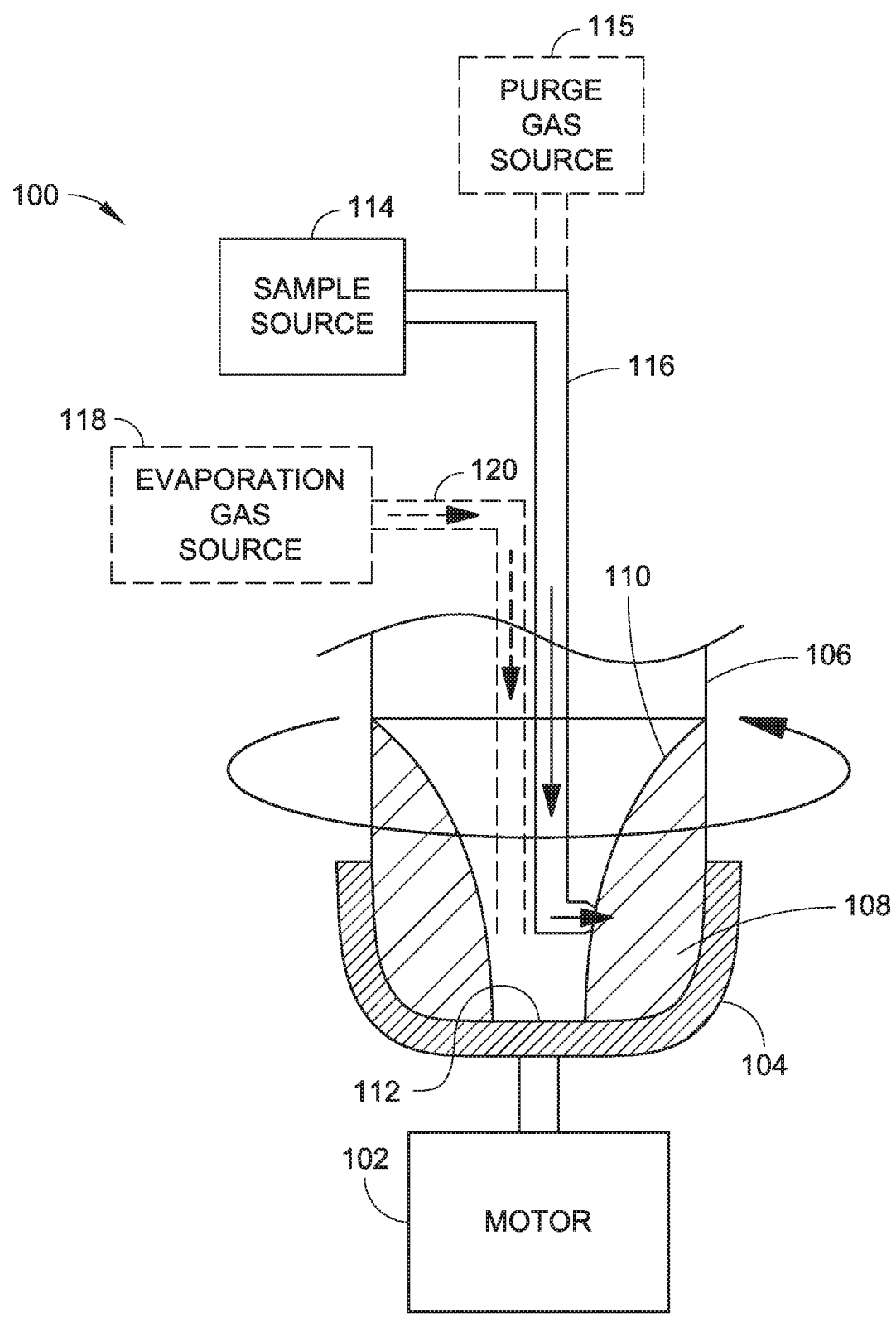
FIG. 2 is schematic diagram of a system for hydrolyzing samples, implemented in accordance with an embodiment of this disclosure.

FIGS. 1A, 1B, and 2 illustrate a system 100 for hydrolyzing samples in accordance with various embodiments of this disclosure. Those skilled in the art will appreciate that the embodiments illustrated in the drawings and/or described herein may be fully or partially combined and/or modified to result in additional embodiments. Accordingly, the illustrated and described embodiments should be understood as explanatory and not as limitations of the present disclosure.

In embodiments illustrated in FIGS. 1A, 1B, and 2, the system 100 is shown to include at least one actuator 102 (e.g., motor) coupled to a receptacle 104 that is configured to receive and firmly grasp or couple to a container 106. In other embodiments, the actuator 104 may be directly coupled with the container 106. The actuator 104 is configured to rotate or otherwise impart motion upon the container 106 to induce a vortex 110 in a liquid 108 (e.g., a receiving liquid such as a HF solution) that is present within the container 106.

In some embodiments, the system 100 includes a sampling assembly (e.g., an auto-sampler assembly), where a sample tube 116 is configured direct one or more fluid samples (e.g., halosilane samples or other gas/liquid samples) into the container 106 from a sample source 114 (e.g., canister) that is fluidically coupled to the sample tube 116. For example, the sample tube 116 can be inserted into the container 106 to direct a stream of the sample into the vortexed receiving liquid 108 (e.g., in the HF solution) while the container 106 is rotated to induce the vortex 110. In some embodiments, the vortex 110 extends to a bottom surface 112 of the container 106. In other embodiments, the vortex 110 does not extend to the bottom surface 112, but only to a certain depth above the bottom surface 112 of the container 106.

The vortex 110 can mix the fluids in the container 106. For example, the sample can be directed into the vortexed receiving liquid 108 to hydrolyze the sample. In some embodiments, the container 106 is spun in one direction (e.g., clockwise or counterclockwise) while the mixing is performed, while in other embodiments, the container 106 is first spun in one direction (e.g., clockwise) and then in another direction (e.g., counterclockwise) while the mixing is performed. A change in direction of mixing can be performed one or more times during the mixing operation. Further, the mixing can be performed at different rotational speeds during a mixing operation. In some embodiments, a mixing operation is performed periodically (e.g., intermittently) to avoid separation of the fluids.

In some embodiments, the system 100 is configured for hydrolyzing a halosilane sample at a controlled rate (e.g., approximately 0.1 to 2 g/min). The rotating container 106 can be pre-filled with or supplied with the receiving liquid 108 (e.g., a HF solution), where the rotation of the container 106 causes the receiving liquid 108 to circulate and form a vortex 110 therein. Rotating the container 106 instead of using a stirring element such as a magnetic stirring bar to create the vortex 110 helps prevent sample contamination that can be caused a magnetic stirring bar or other stirring element placed within the container 106.

In some embodiments, the container 106 can be made from an inert high purity material such as PFA or PTFE. Further, the halosilane sample can be directed into the vortexed receiving liquid 108 through an inert chemically resistant sample tube 116. As shown in FIG. 1B, the sample tube 116 can be oriented to release the halosilane sample in a flow direction of the vortexed receiving liquid 108. In this manner, the sample can be introduced in a way that prevents the receiving liquid 108 from reacting with and polymerizing the sample as it enters the receiving liquid 108. The vortex 110 works to remove the sample tube 116 or tube nozzle into the rapidly spinning receiving liquid 108. The sample enters the vortexed receiving liquid 108 which rapidly draws the sample away from the sample tube 116, preventing polymerization or heat-producing reaction at the exit of the sample tube 116. In some embodiments, the halosilane sample can also be preceded by an inert gas stream (e.g., from a purge gas source 115) flowing through the same sample tube 116, where the inert gas stream continues until the receiving liquid 108 is sufficiently agitated to ensure that the receiving liquid 108 can rapidly disperse the halosilane sample for hydrolysis to prevent excess formation of reactants at the point of introduction.

In some embodiments, an end of the sample tube 116 that directs the halosilane sample into the vortexed receiving liquid 108 may be tapered or coupled to a nozzle (e.g., as shown in FIG. 1A) or may have a sufficiently small diameter (e.g., approximately 1 mm or less) to reduce the cross-sectional contact area between the halosilane sample and receiving liquid 108. A tapered end or nozzle can serve to rapidly inject the halosilane into the receiving liquid 108 for better mixing of the halosilane sample with the receiving liquid 108.

After hydrolysis of the halosilane sample, the receiving liquid 108 (mixed with the halosilane) can be evaporated. In some embodiments (e.g., as shown in FIG. 2), the evaporation can be accelerated by introduction of an evaporation gas (e.g., nitrogen) from an evaporation gas source 118 (e.g., a second canister or the like) via a second tube 120 (e.g., another tube similar to tube 116), sometimes referred to herein as an "evaporation gas addition line." The evaporation gas can be optionally heated to further accelerate the evaporation rate of the receiving liquid 108. In some embodiments, the evaporation gas addition line 120 and the sample line/tube 116 may be parallel to each other. In some embodiments, the evaporation gas addition line 120 and the sample tube 116 may be maintained at fixed positions while the container 106 of receiving liquid 108 is rotated.

In some embodiments, the system 100 further includes an exhaust port with scrubber around the area of the container 106. The scrubber may consist of a caustic, such as NaOH. After evaporation, a small volume of acid may reconstitute the residue from the sample into liquid phase for chemical analysis by ICPMS or GFAA. If the sample is not evaporated, it may instead be inline pH adjusted with ammonium hydroxide or other base solution and then passed through a chelation column. Silicate species may pass through the chelation column to waste, while metal contaminants are retained on the column. In some embodiments, a valve system may be used to direct the sample liquid through the column. Further, a valve system with loop may be used to define a volume of sample liquid to pass through the column. In some implementations, the metal contaminants may be eluted from the column using an acidic solution. The eluted metal contaminants may be directly eluted to an ICPMS nebulizer or a GFAA tube for analysis, or in some implementations, the eluted metal contaminants may be eluted into a collection tube for later analysis using ICPMS or GFAA.

Example Process Implementations

Figure 3:
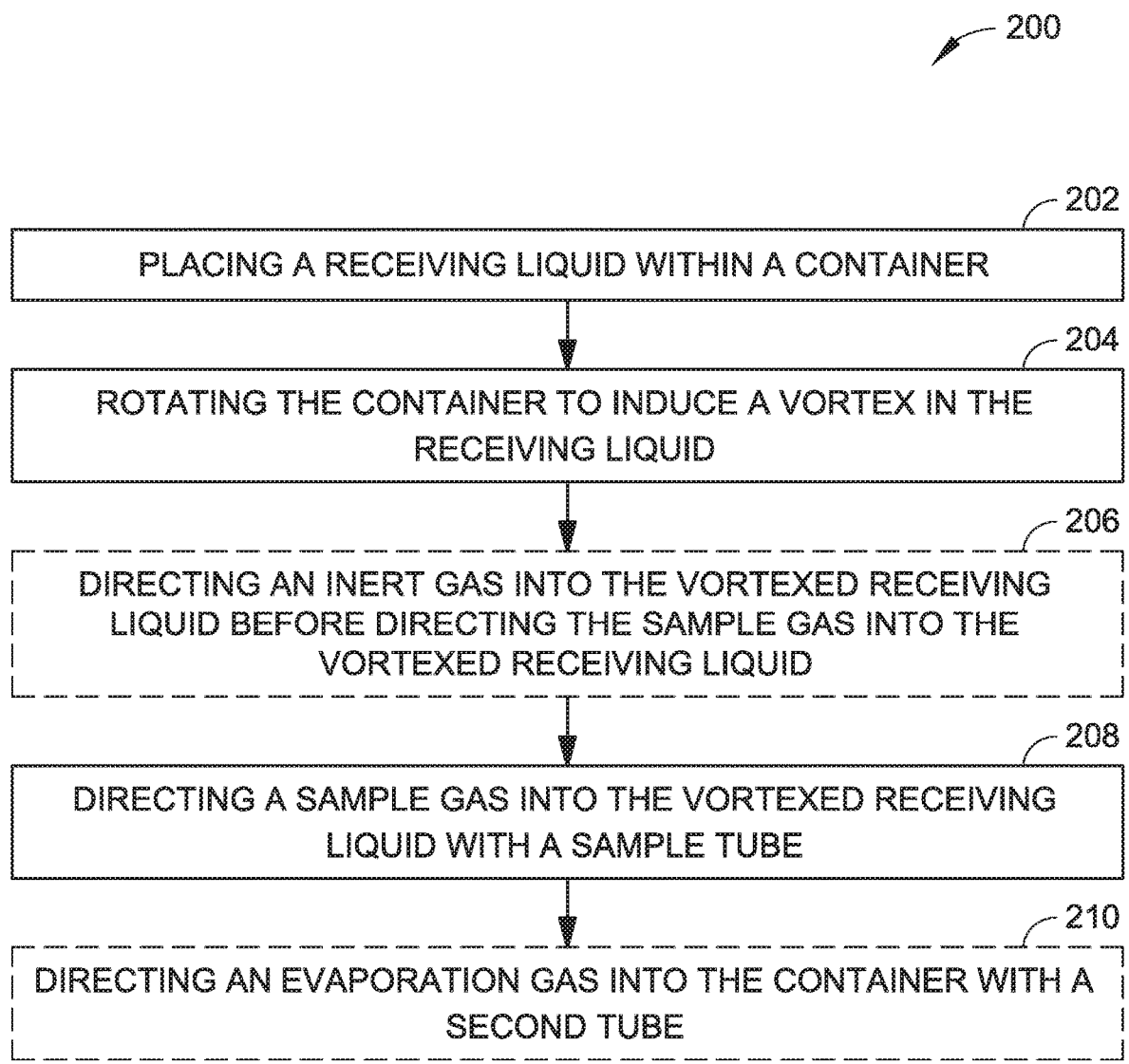
FIG. 3 is a flow diagram showing an implementation of a method for hydrolyzing samples.

FIG. 3 is a flow diagram illustrating a method 200 for hydrolyzing samples in accordance with one or more disclosed implementations. In some implementations, the method 200 can be executed utilizing the system 100 described herein. In this regard, in addition to the steps or operations described below, the method 200 can further include any steps or operations disclosed with regard to embodiments of the system 100 described herein.

At block 202, a receiving liquid (e.g., a receiving liquid such as a HF solution) is placed within a container (e.g., a container such as container 106). For example, the receiving liquid can be pre-loaded within the container or fed into the container by a tube or spout directed the receiving liquid into the container.

At block 204, the container can be rotated to induce a vortex in the receiving liquid. For example, the container can be directly rotated by an actuator (e.g., motor 102) or a holder supporting the container can be rotated to effectively rotated the container about a longitudinal (e.g., central) axis of the container. In some embodiments, the container is rotated in one direction (e.g., clockwise or counterclockwise). In other embodiments, the container is rotated in an oscillatory fashion (e.g., clockwise and then counterclockwise, or vice versa).

Optionally, at block 206, an inert gas may be directed into the vortexed receiving liquid prior to directing a sample into the liquid. For example, a halosilane sample may be preceded by an inert gas stream flowing through the same sample tube 116, where the inert gas stream continues until the receiving liquid 108 is sufficiently agitated to ensure that the receiving liquid 108 can rapidly disperse the halosilane sample for hydrolysis to prevent excess formation of reactants at the point of introduction.

At block 208, the sample (e.g., a halosilane sample or the like) is directed into the vortexed receiving liquid with a sample tube. For example, the sample can be fed through a tube (e.g., a tube such as tube 116) into the vortexed receiving liquid (i.e., into the rapidly stirring liquid), such that the sample rapidly disperses and becomes hydrolyzed by the receiving liquid. As shown in FIG. 1B, the sample tube 116 can be oriented to release the halosilane sample in a flow direction of the vortexed receiving liquid 108. For example, the sample enters the vortexed receiving liquid 108 which rapidly draws the sample away from the sample tube 116, preventing polymerization or heat-producing reaction at the exit of the sample tube 116.

Optionally, at block 210, an evaporation gas (e.g., nitrogen) can be directed into the container with a second tube (e.g., a second tube such as evaporation gas addition line 120). The evaporation gas can aid in evaporating the receiving liquid (mixed with the halosilane sample) so that the fluid sample (i.e., the receiving liquid and halosilane sample mixture) can be directed to an analysis instrument (e.g., ICPMS or GFAA instrument). In some embodiments, the evaporation gas can be heated to accelerate the evaporation rate of the fluid sample.

It is to be understood that the invention is defined by the appended claims. Although embodiments of this invention have been illustrated, it is apparent that various modifications may be made by those skilled in the art without departing from the scope and spirit of the disclosure.

What is claimed is:

1. A system for hydrolyzing samples, comprising:
    a container with a receiving liquid contained therein, the container defining a longitudinal central axis;
    an actuator rotationally coupled with the container in line with the longitudinal central axis of the container, the actuator being configured to rotate the container about the longitudinal central axis thereof, thereby inducing a vortex in the receiving liquid; and
    a sample tube configured to direct a sample into the vortexed receiving liquid, wherein the sample tube is oriented to release the sample in a flow direction of the vortexed receiving liquid.

2. The system of claim 1, wherein the sample comprises a halosilane.

3. The system of claim 1, wherein the receiving liquid comprises a hydrofluoric acid solution.

4. The system of claim 1, wherein the sample tube is configured to direct an inert gas into the vortexed receiving liquid prior to introduction of the sample.

5. The system of claim 1, wherein an end of the sample tube that directs the sample into the vortexed receiving liquid is tapered or coupled to a nozzle.

6. The system of claim 1, further comprising a second tube configured to direct an evaporation gas into the container.

7. The system of claim 6, wherein the evaporation gas comprises nitrogen.

8. The system of claim 6, wherein the evaporation gas is heated above an ambient temperature.

9. The system of claim 6, wherein the sample tube and the second tube are parallel to one another.

10. The system of claim 6, wherein the sample tube and the second tube are stationary while the container is rotated.

11. A method for hydrolyzing samples, comprising:
    placing a receiving liquid within a container, the container defining a longitudinal central axis;
    rotating the container about the longitudinal central axis thereof to induce a vortex in the receiving liquid, using an actuator rotationally coupled with the container in line with the longitudinal central axis of the container; and
    directing a sample into the vortexed receiving liquid with a sample tube, wherein the sample tube is oriented to release the sample in a flow direction of the vortexed receiving liquid.

12. The method of claim 11, wherein the sample comprises a halosilane.

13. The method of claim 11, wherein the receiving liquid comprises a hydrofluoric acid solution.

* * * * *